Patented June 27, 1939

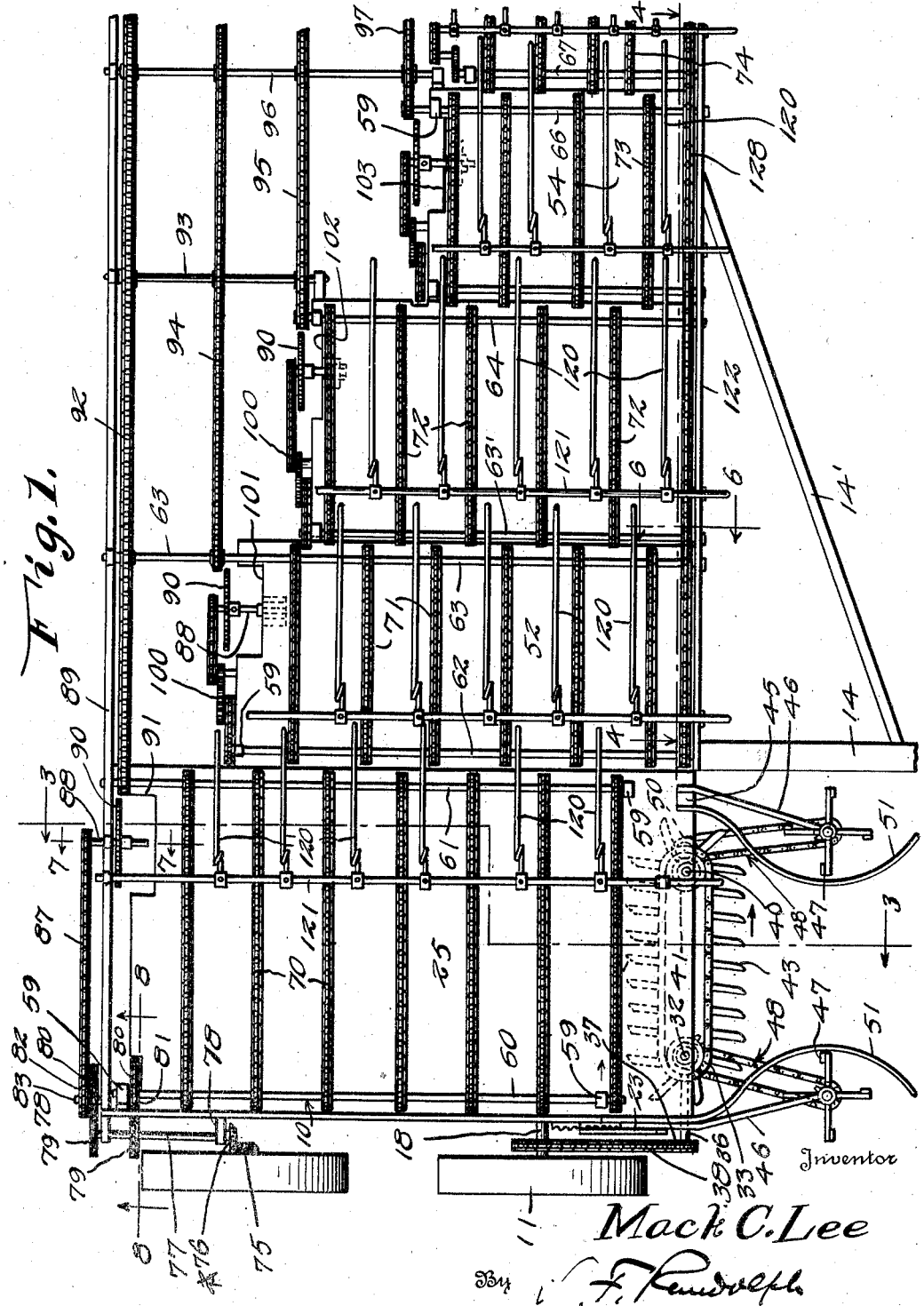

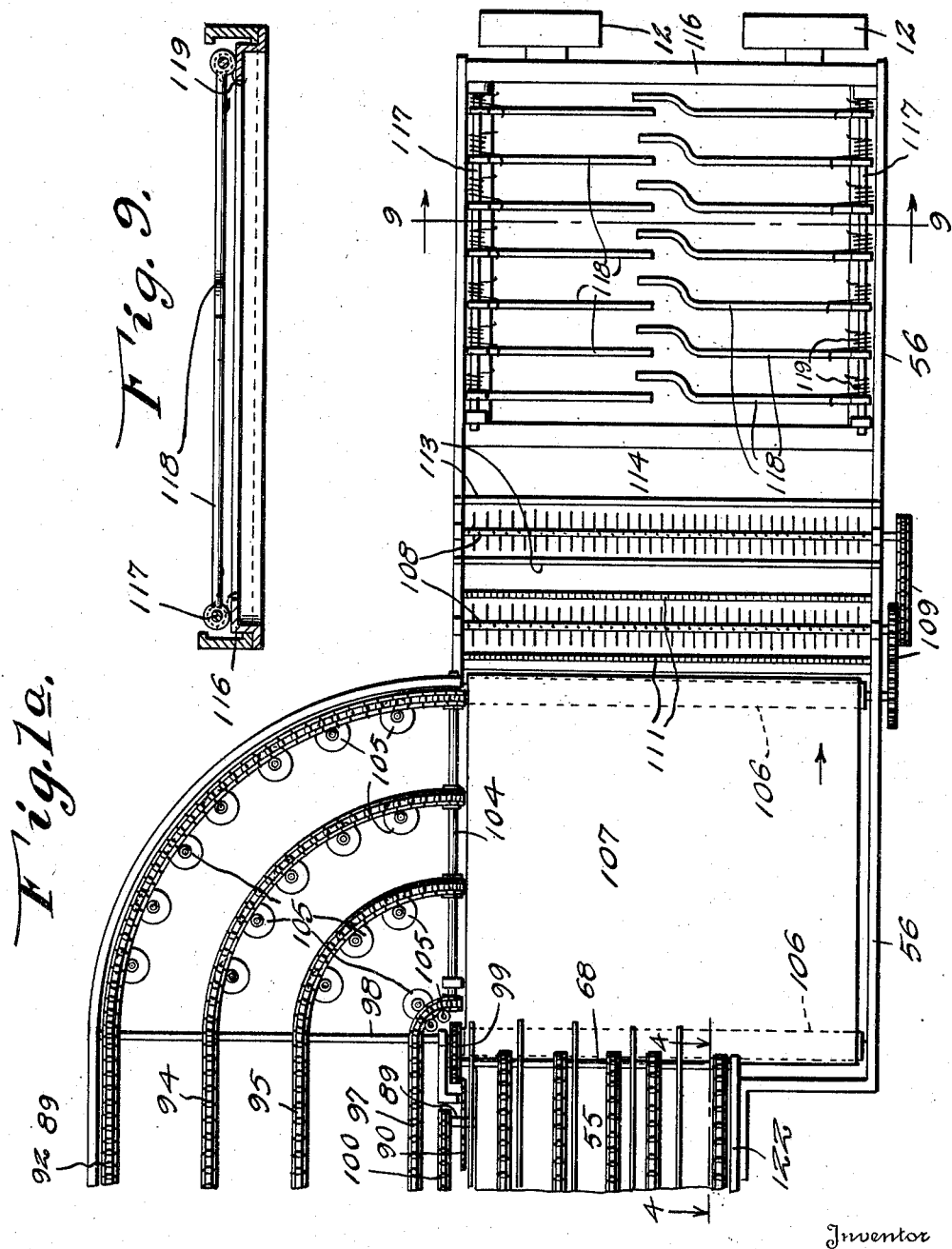

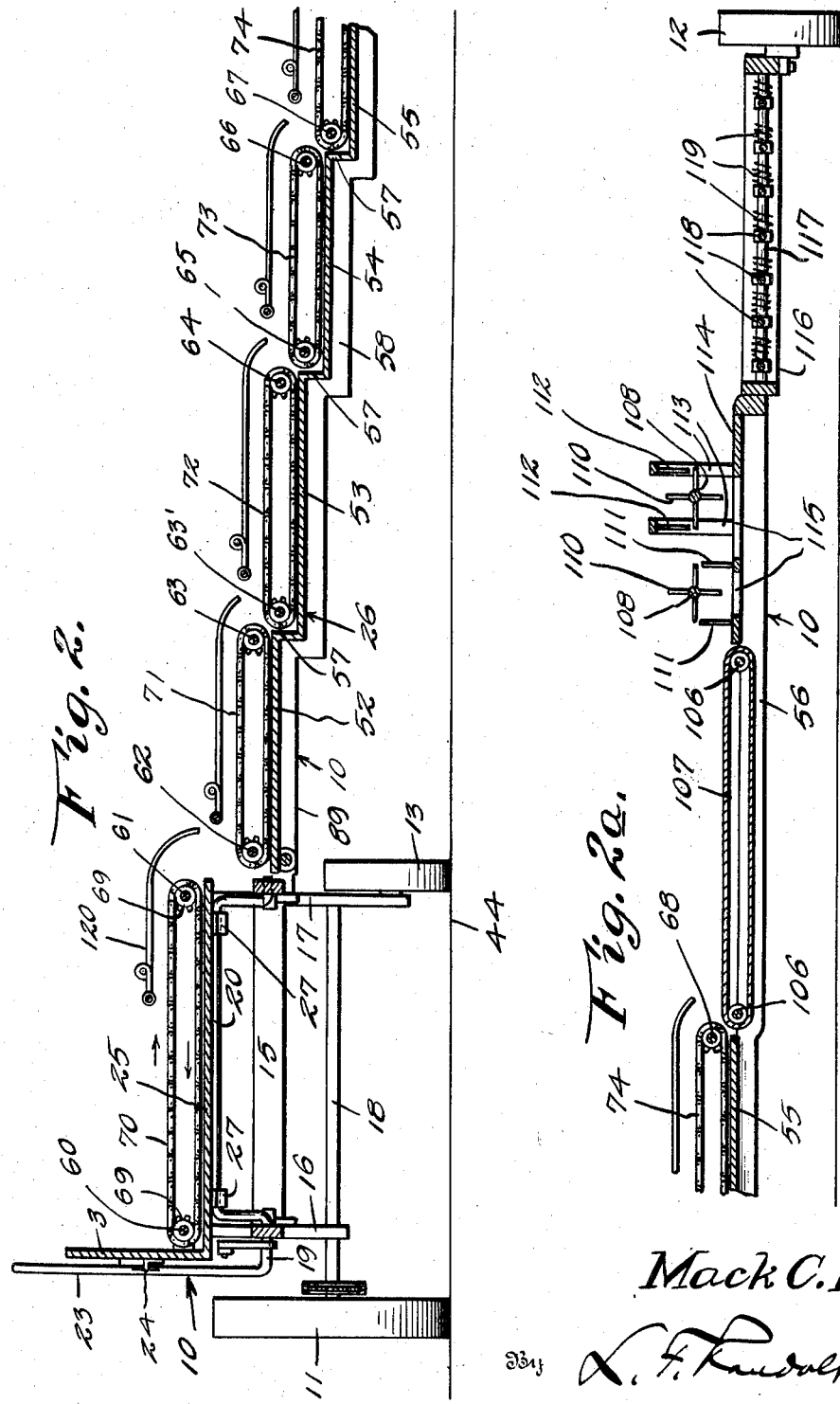

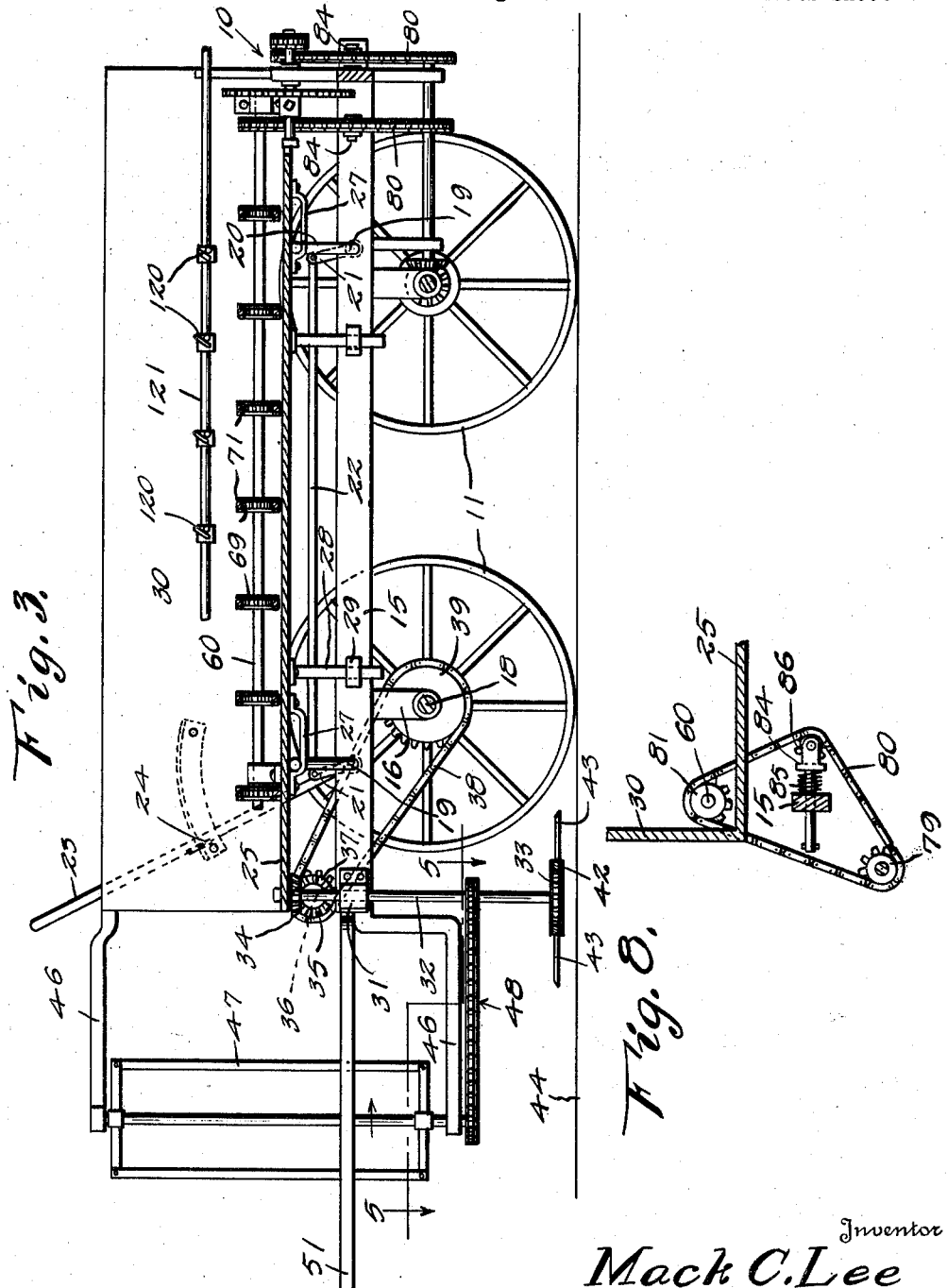

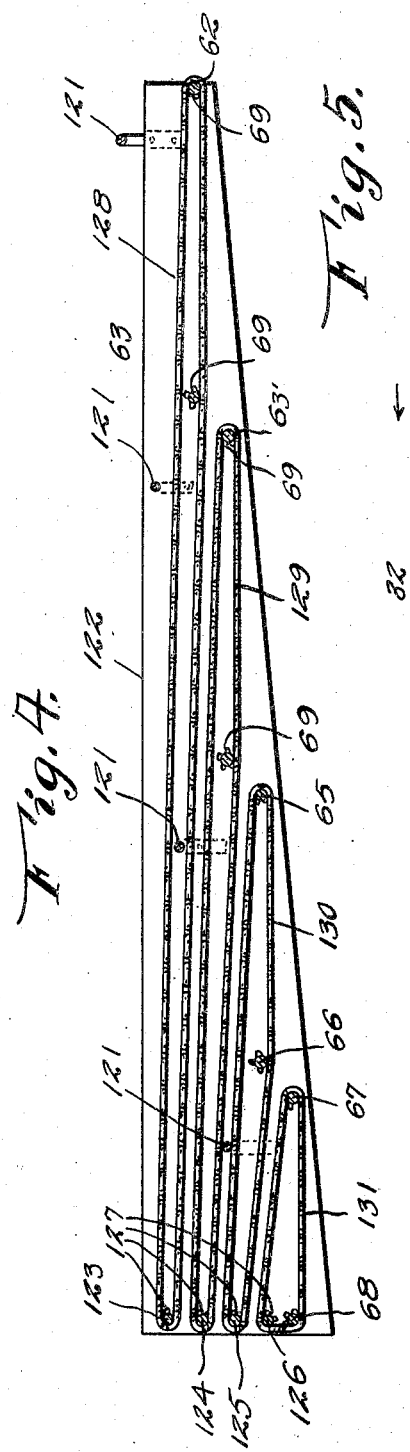

2,164,249

UNITED STATES PATENT OFFICE 2,164,249

SUGARCANE CUTTER

Mack Carter Lee, Rayne, La., assignor of one-fourth to Charlie Porter, Port Arthur, Tex.

Application August 4, 1938, Serial No. 223,117

18 Claims. (Cl. 56—62)

This invention relates to an improved harvesting machine for sugar cane, corn and similar stalks.

It is an object of this invention to provide a harvesting machine having means for cutting the sugar cane stalks close to the ground, directing the stalks onto a truck, conveying the stalks relatively to the truck, cutting the stalks into predetermined lengths during their travel, stripping the stalks, and dumping the stalks into piles of predetermined sizes.

More particularly, it is an aim of this invention to provide a truck having cutting means connected to a ground wheel of the truck for cutting the standing stalks, means for knocking the stalks onto a set of endless conveyors, and means for directing the stalks over a plurality of sets of endless conveyors to be cut by a plurality of revolving knives into predetermined lengths convenient for milling.

Still a further object of the invention is to provide means for retaining the stalks in engagement with the endless conveyors to hold the stalks firmly while being engaging by the rotary knives.

Other objects and advantages of the invention will hereinafter become more fully apparent from the following description of the drawings, which illustrate a preferred embodiment of the invention, and wherein:—

Figures 1 and 1a are a top plan view of the machine,

Figures 2 and 2a are a longitudinal vertical sectional view of the same,

Figure 3 is a transverse vertical sectional view taken on the line 3—3 of Figure 1, Figure 4 is a longitudinal vertical sectional view taken on the line 4—4 of Figures 1 and 1a, Figure 5 is a horizontal sectional view taken on the line 5—5 of Figure 3.

Figure 6 is a vertical transverse sectional view taken on the line 6—6 of Figure 1, Figure 7 is a transverse vertical sectional view taken on the line 7—7 of Figure 1, Figure 8 is a longitudinal vertical sectional view taken on the line 8—8 of Figure 1, and Figure 9 is a transverse vertical sectional view taken on the line 9—9 of Figure 1a.

Referring more particularly to the drawings, wherein like reference characters designate like or corresponding parts throughout the different views, 10 designates generally the truck provided at one end with the two large ground wheels 11 and at its opposite end with the two small wheels 12. The intermediate portion of the truck 10 is supported by the wheels 13 corresponding to the wheels 12, and the truck 10 is of the trailer type adapted to be drawn by a tongue or drawbar 14 having a diagonal brace 14', as seen in Figure 1.

Referring particularly to Figures 2 and 2a, it will be seen that a framework 15 is provided having the depending standards 16 and 17 in which are journaled the axles 18 keyed to the wheels 11. Standards 17 at their lower ends are provided with stub axles on which are rotatably mounted the wheels 13, which cooperate with the wheels 11 in supporting the frame 15. The shafts 19 are journaled in opposite sides of the frame 15, and are provided with the upwardly offset portions or cranks 20 and with the lever arms 21 which are connected by a link 22 to cause both of the cranks 20 to move as a unit when actuated by the operating lever 23, which is adapted to be adjustably held by means of the conventional latch mechanism 24.

A platform 25, forming a part of the flooring of the truck 10, designated 26, is supported by the cranks 20 which are adapted to engage the brackets 27 on the underside of the platform 25. The rods 28 depend downwardly from the platform 25 and slidably engage the guide members 29 secured to the frame 15 for raising and lowering the platform 25 by actuating the lever 23 to cause the cranks 20 to move relatively to the slots formed by the brackets 27. Platform 25, at the side adjacent the wheels 11 is provided with an upwardly extending side 30 to which is secured the rack bar, as seen in dotted lines in Figure 3, which forms a part of the latch mechanism 24.

Loosely journaled intermediate of its ends in the bearing 31, secured to the forward end of the frame 15, is the vertically disposed shaft 32 the upper end of which is journaled in the platform 25, and the lower end of which is provided with a sprocket wheel 33. Shaft 32 adjacent its upper end has a beveled gear 34 keyed thereto, which is adapted to mesh with a beveled gear 35 keyed to one end of the shaft 36 which is journaled on the frame 15, and which has a sprocket wheel 37 keyed to its opposite end and connected by a chain 38 to a sprocket wheel 39 keyed to the front axle 18 which is secured to the front wheel 11. By lowering the platform 25 slightly as heretofore described, the beveled gear 34 will be lowered into meshing engagement with the gear 35, so that when the truck 10 is moved motion will be imparted to the shaft 32 from the front wheel 11. As seen in Figure 1, a shaft 40 is disposed parallel to and in spaced relationship to the shaft 32, and is likewise journaled in the platform 25 and the frame 15, not shown, and is provided with a sprocket wheel 41, as best seen in Figure 5, which is connected to the sprocket wheel 33 by a chain 42 having the spaced outwardly extending knife blades 43 adapted to operate relatively close to the ground level designated 44, as seen in Figure 3, to cut various types of growing stalks, as the machine 10 is drawn through a field. Extending outwardly from the frame 15, the wall 30, and an upright 45 secured to the frame 15, are the arms 46 in which are journaled the vertically disposed reels 47 which are connected to the shafts 32 and 40 by the sprockets and chains designated generally 48. As seen in Figure 5, the sprocket wheel and chain connection 48 which connects with the shaft 40 includes a secondary shaft 49 driven by the gears 50 which are keyed to the shafts 40 and 49. The knives 43 and the reels 47 are actuated to move in the direction as indicated by the arrows in Figure 5 to cut the stalks, not shown, after which the reels 47 knock the stalks onto the platform 25. Spring guide members 51, are provided, secured to the frame 15 and extending outwardly around the reels 47 to compress the stalks and direct them inwardly to be engaged by the blades 43.

As best seen in Figures 2 and 2a, the truck floor 26 includes in addition to the platform 25 the platforms 52, 53, 54, 55 and its continuation 56. Platforms 52 to 55 are arranged in downwardly stepped relationship relatively to each other and to the platform 25, and are connected by the vertical portions 57 and supported on the framework 58 which is connected to the frame 15 at one end and supported at its opposite end by the wheels 12.

Each of the platforms is provided with a plurality of bearing members 59 which extend upwardly from the platforms to journal shafts 60 and 61 mounted at opposite ends of the platform 25, shafts 62 and 63 mounted at opposite ends of the platform 52, shafts 63' and 64 mounted at opposite ends of the platform 53, shafts 65 and 66 of platform 54, shafts 67 and 68 of platform 55. Keyed to each of these shafts, is a plurality of sprocket wheels 69 to which are connected the sets of chains 70, 71, 72, 73 and 74 which are disposed above the platforms 25, 52, 53, 54 and 55, respectively. These sets of chains form endless conveyors which are disposed in stepped relationship relatively to each other as seen in Figures 2 and 2a and which are adapted to be actuated as will hereinafter be described, to convey the cane or corn stalks transversely of the machine 10.

Connected to the rear wheel 11 by means of the beveled gears 75 and 76, is the shaft 77 which is journaled in the bearing members 78 and to which is keyed the corresponding spaced sprocket gears 79 adapted to be connected by the corresponding chains 80 to the sprockets 81 and 82 which are keyed to shaft 60 and to a shaft 83, respectively. As best seen in Figure 8, the chains 80 are provided with the tensioning means 84 mounted on the frame 15 and projected by the springs 85 to cause the sprocket wheels 86 carried thereby to engage and tension the chains 80.

Shaft 83 is provided at its outer end with a sprocket connected to a chain 87 which connects with a sprocket on the shaft 88 journaled in the back rail 89 of the truck 10, and to which is adjustably keyed the rotary cutter 90 adapted to be positioned relatively to the platform 25 in its recess 91. It will thus be seen, that when the truck 10 is moved the back wheel 11 will actuate the chains 80 to not only actuate the rotary cutter 90 but likewise the shaft 60 to cause its endless chains 70 to move in the direction as indicated by the arrows in Figure 2 to revolve shaft 61, which is connected by means of one of its sprockets 69 to the shaft 63 through the chain 92. Shaft 63 actuates its chains 71 which in turn revolves shaft 62, and the chain 92 connects with a sprocket keyed to the shaft 93 to actuate the chain 95 connected thereto by a sprocket, and which is also connected to one of the sprockets 69 on the shaft 64 to actuate the chain 72 to revolve the shaft 63'. The shafts 63 and 93 are connected by means of sprocket wheels to the chain 94, and the chains 92, 94 and 95 are connected by sprocket wheels to the shaft 96 which is connected by a chain 97 and one of its sprockets to a sprocket wheel 69 of the shaft 66 to actuate the conveyor chains 73 and the shaft 65. Chains 92, 94, 95 and 97 actuate the shaft 98 which is connected by the gears 99 to the shaft 68 to actuate the endless chain conveyors 73 to revolve the shaft 67.

Shafts 62, 63', 65 and 67 are connected by the gearing means, designated 100, with their shafts 88 to which are adjustably keyed the remaining rotary cutters 90 which are adapted to be adjustably positioned relatively to the platforms 52, 53, and 54 by the slots or recesses 101, 102 and 103, respectively, formed in the outer or rear end of said platforms. As seen in Figure 1, each succeeding platform is shorter than the former platform so that the rotary cutters 90 are offset relatively to each other and their offset relationship may be varied by adjusting them relatively to their shafts 88, as heretofore described, and as clearly illustrated in Figures 1 and 1a.

Chains 92, 94, 95 and 97 connect with sprocket wheels keyed to a shaft 104 which is disposed at right angles to the other shafts to which these chains connect, and in order to bend the chains the rollers 105 are provided which are disposed in arcuately arranged rows as seen in Figure 1a to bend these chains and to cause them to revolve the shaft 104 at a uniform speed to the other shafts.

Journaled in the framework 56 beyond the lowermost platform 55 are the spaced rollers 106 over which is trained the endless belt 107 which is driven by means of one of the rollers 106 which is connected to the shaft 98. The shaft 104 is disposed adjacent and parallel to the inner longitudinal side of the belt 107 for a purpose which will hereinafter be described.

Journaled in the framework 56 beyond the belt 107, are the rods 108 which are arranged in spaced relationship to each other and which are driven off of one of the rollers 106 by the gear means 109. The rods 108 are provided with the radially disposed teeth 110, the teeth of one of said rods being adapted to co-act with the upwardly extending stationary teeth 111 and the teeth of the other rod 108 co-acting with the depending teeth 112 supported by the arch members 113. Frame 56 contiguous with the rods 108, which form a part of the stripping mechanism, is provided with a flooring 114 having the recesses or slots 115 disposed beneath the shearing mechanism for a purpose which will hereinafter be described. End 116 of the frame 56, is formed in the shape of a rectangular open frame having the oppositely disposed shafts 117 journaled therein and to which are secured the inwardly extending overlapping bars 118 which are normally held in a horizontal position by the springs 119.

Disposed above each of the platforms and above each set of the endless conveyor chains, is a set of spring fingers 120 mounted on the rods 121 which are secured at their corresponding ends to the front rail 122 forming a part of the framework 56, or to the back rail 89.

As seen in Figure 4, the front rail 122 at its larger or lower end is provided with the stub shafts 123, 124, 125 and 126 disposed one above the other and each having a sprocket wheel 127 keyed thereto. A chain 128 is trained over the sprocket wheels 69 of the shafts 62 and 63 and over the sprocket wheel 127 of the shaft 123, a chain 129 is correspondingly connected to the shafts 63', 64 and 124, a chain 130 is similarly connected to the shafts 65, 66 and 125 and a chain 131 is likewise connected to the shafts 67, 68 and 126. These chains move along the inner side of the rail 122 and function to prevent the stalks from engaging the inner side of said rail and clogging so that their tips will be swung around relatively to the platforms and as a result will not be disposed transversely to the revolving cutters 90. This is important if the stalks are to be cut into corresponding lengths.

From the foregoing it will be seen, that the machine 10 can be attached to any suitable draft means such as a tractor, not shown, by the tongue 14 and be drawn through a field containing standing stalks so that the outer edge of the field will be engaged by the spring guide members 51 to direct the stalks inwardly to be engaged and cut by the blades 43 which are moving in the direction as indicated by the arrows in Figure 1. The reels 47 revolving in the direction as indicated by the arrows in Figure 1, will engage the tops of the stalks to knock them onto the chains 70 which are moving over the platform 25. It is to be understood, that the portion of the machine 10 beyond the platform 25 will be moving over the part of the field from which the standing stalks have already been cut. As heretofore described, the reels 47 and the knives 43 are driven from the front wheel 11 while the rotary cutters 90 and the chain conveyors 70 are driven from the rear wheel 11, so that the stalks which are thrown onto the chains 70 of the platform 25 will be moved transversely of the machine 10 or toward the platform 52. The stalks, which have not been shown, will be of various lengths, so that in the longest stalks the tips may extend beyond the back rail 89 and these tips will be cut off by the first rotary cutter 90 which is disposed contiguously with the platform 25 so that these tips will be dropped behind the machine 10. The stalks will then come in contact with the first set of spring fingers 120 which are mounted above platform 25 to be pressed downwardly into engagement with the endless conveyors 70 so that they will be directed onwardly and dropped onto the set of conveyors 71 of the platform 52 and again engaged by the spring fingers 120 mounted thereabove and held while being again cut by the rotary cutter 90 disposed contiguously with this platform. This operation is repeated at each succeeding platform and on each platform an additional predetermined length is cut from each stalk so that only the butt ends of the stalks will be conveyed by the chains 73 onto the endless belt 107. It is to be understood, that additional stalks are constantly being thrown onto the chains 70 so that the operation, as heretofore described, is constantly being repeated on each of the platforms.

The lengths which are cut-off beyond the first platform 25 are conveyed by the chains 92, 94, 95 and 97 around the back part of the machine and onto the endless belt 107 transversely to its direction of movement. The cut sections of stalks are conveyed by the belt 107 to the strippers and forced by the stalks behind between the revolving teeth 108 and the stationary teeth 111 for stripping the leaves from the cut sections of the stalks, which leaves are dropped through the slots 115. The stripped stalks are kicked by the last set of revolving teeth 110 onto the bars 118 which form the automatic dumping mechanism, and when the weight of the stalk sections is sufficient to overcome the springs 119, bars 118 swing downwardly to dump the stalks supported thereon in a pile, and after this weight has been removed the springs 119 will return the bars 118 to their normal horizontal position. The stalks left in the piles have been cut into sections of predetermined lengths and stripped of their foliage so that they are ready to be picked up and used for any purpose for which they are deemed suitable.

As heretofore described, the cutters 90 are adjustably positioned on their shafts 88 so that the lengths of the cut sections of the stalks may be varied, and additional cutters 90 and/or additional platforms may be provided depending upon the lengths to which it is desirable to cut the stalks.

While the invention has been described particularly in connection with sugar cane stalks, it is to be understood that it is equally well adapted for cutting and stripping corn stalks or any other similar stalks which are useful for milling or other purposes.

Various modifications and changes may obviously be made in the construction and arrangement of the parts forming the machine, as the drawings and description are only intended to illustrate a preferred embodiment thereof, and the right is therefore expressly reserved to make such variations and changes as do not depart from the spirit and scope of the invention as hereinafter defined by the appended claims.

I claim as my invention:

1. A device of the class described comprising a wheeled vehicle, said vehicle being provided with a plurality of floors arranged in stepped relationship relatively to each other, endless conveyor means arranged to move above each of said floors, cutter means disposed in front of and beneath the highest of said floors, and rotary cutting blades positioned at the outer end of each of said floors and in offset relationship relatively to each other.

2. In a stalk harvesting machine, a wheeled vehicle having a flooring comprising a plurality of stepped platforms transversely arranged relatively to said vehicle, endless conveyor means moving over each of said platforms, cutter means mounted to operate in front of the first and highest platform, means mounted in front of said vehicle and adapted to direct the cut stalks onto the endless conveyor means of said highest platform, said conveyor means adapted to convey the stalks successively over said platforms, and rotary cutters mounted adjacent the outer end of each of said platforms, connected to said endless conveyors and arranged in offset relationship to each other to cut said stalks into a plurality of predetermined lengths.

3. A device as in claim 2, and spring fingers mounted above each of said platforms and adapted to engage the stalks to hold them in engagement with said endless conveyors and with the rotary cutters.

4. A device as in claim 2, chain conveyor means for cooperating with said endless conveyor means for conveying certain of the cut portions of said stalks to an endless belt, said endless belt communicating with the last and lowermost floor or platform for receiving the remaining cut portions of the stalks, and revolving rods arranged at the opposite end of said endless belt and provided with radially disposed teeth for stripping the sections of said stalks.

5. In a sugar cane cutter, a wheeled vehicle having endless cutting means mounted in front of one end of said vehicle and adapted to cut sugar cane, reels rotatably mounted above said cutter to direct the cane onto said vehicle, and a plurality of sets of endless conveyors disposed in stepped relationship relatively to each other for conveying said stalks transversely of said vehicle.

6. A device as in claim 5, and rotary cutters mounted on said vehicle contiguously with certain of said endless conveyors and in spaced offset relationship relatively to each other for successively engaging and cutting the stalks into a plurality of lengths as they are conveyed.

7. In a cane harvesting machine, a wheeled vehicle having a floor comprising a plurality of platforms arranged in stepped relationship relatively to each other, cutter means mounted in front of one end of said vehicle and in front of the highest of said platforms, driving means adapted to connect said cutter means to a ground wheel of the vehicle, vertically disposed reels mounted above and driven from said cutter means and adapted to knock the stalks cut by the cutting means onto said highest platform, a plurality of endless conveyors arranged in sets to move above said platforms, rotary cutters carried by said platforms and arranged in spaced staggered relationship relatively to each other, and driving means connecting said endless conveyors and rotary cutters to a ground wheel of said vehicle for conveying and cutting the stalks into predetermined lengths.

8. A device as in claim 7, an endless belt having one end disposed beneath and adjacent to the last and lowermost platform to receive the cut portions of said stalks, and a trimming apparatus disposed at the opposite end of said endless belt and driven thereby for stripping the stalks.

9. A device as in claim 7, and rods disposed above and transversely of said endless conveyors, each of said rods being provided with a plurality of spring fingers to retain the stalks in engagement with the conveyors and with the rotary cutters.

10. A harvesting machine comprising a wheeled truck, means carried and actuated by said truck and adapted to cut and direct stalks onto the floor at one end of said truck, a plurality of sets of endless conveyors mounted to move above said floor, rotary cutters connected to said endless conveyors and disposed in spaced staggered relationship relatively to each other, and a driving mechanism connecting said endless conveyors to a ground wheel of said truck and to each other for conveying said stalks successively into engagement with said rotary cutters.

11. In a sugar cane harvesting machine, a truck having a floor formed of a plurality of platforms arranged in stepped relationship relatively to each other, sets of endless conveyors operating above each of said platforms, a cutter, comprising a plurality of blades mounted on an endless chain, disposed beneath and in front of the first and highest of said platforms, resilient guide members extending outwardly in front of said cutter and adapted to direct and guide the stalks thereto to be cut, reels disposed above said cutter and connected thereto, operating means connecting said cutter and reels to a ground wheel of said truck; rotary cutters adjustably positioned relatively to said platforms and disposed in offset spaced relationship relatively to each other, means, comprising a plurality of sprocket wheels and chains connecting said sets of conveyors to each other and to said rotary cutters, means for connecting said conveyors and rotary cutters to a ground wheel of the truck to be driven thereby; means connected to and driven by said endless conveyors and disposed beyond the last and lowermost platform for stripping said stalks, and weight actuated dumping means to receive the stripped stalks and to be actuated periodically by their weight.

12. A cane harvesting machine comprising a plurality of endless conveyors disposed in stepped relationship relatively to each other and adapted to successively receive cane to be harvested, rotary cutters disposed contiguously with certain of said endless conveyors and in spaced staggered relationship relatively to each other for successively engaging and cutting the stalks of cane into sections of predetermined lengths, and endless conveyor means for receiving and conveying the cut sections of the cane.

13. A cane harvester comprising a plurality of endless conveyors arranged in stepped relationship relatively to each other and adapted to receive and convey the cane to be harvested, rotary cutters disposed contiguously with certain of said endless conveyors and in spaced staggered relationship to each other to successively engage the cane for cutting it into a plurality of sections of predetermined length, and yieldable means disposed above said conveyors for engaging and holding the cane against the conveyors and against the cutters.

14. A device as in claim 13, comprising toothed rotary stripping means, and an endless belt disposed to receive the cut sections of the cane from said endless conveyors for conveying the cane sections to the rotary stripper.

15. A cane harvesting machine comprising a flooring including a plurality of stepped platforms, endless conveyors moving transversely over said platforms, means for cutting and delivering cane to the highest of said platforms, and rotary cutters mounted on certain of said platforms and disposed in spaced staggered relationship relatively to each other for successively engaging the cane carried by said endless conveyors for cutting the cane into sections of predetermined lengths.

16. A device as in claim 15, and yieldable means mounted above each of said platforms and adapted to engage and hold the cane against said conveyors and cutters.

17. A device as in claim 15, and rotary stripping means adapted to receive the cane sections for removing the leaves.

18. A device as in claim 15, comprising gravity actuated dumping means for said cane sections comprising sets of inwardly projecting pivotally mounted resiliently supporting fingers adapted to receive the cane sections to be periodically actuated by the weight thereof for dumping the cane sections in piles.

MACK CARTER LEE.